United States Patent Office 3,524,796
Patented Aug. 18, 1970

3,524,796
STARCH PHOSPHATE-KETENE DIMER EMULSION AS INTERNAL PAPER SIZE
Naoyuki Henry Yui, Chicago, Ill., and Lawrence R. Cohen, Hammond, Ind., assignors to American Maize-Products Company, a corporation of Maine
No Drawing. Filed Jan. 6, 1967, Ser. No. 607,663
Int. Cl. D21h 3/28, 3/36
U.S. Cl. 162—175          11 Claims

ABSTRACT OF THE DISCLOSURE

An aqueous emulsion of a ketene dimer and an anionic starch phosphate derivative, the latter being defined by the method of preparation thereof, is added to paper beater stock to internally size the paper and achieve improved results.

---

The invention relates to a novel composition comprising an aqueous emulsion of a ketene dimer and an anionic starch phosphate derivative and to the use thereof as in internal paper size.

It has been proposed heretofore to use an emulsion of a ketene dimer for sizing paper. Inasmuch as the cellulose fibers of paper are anionic and attract cationic polyelectrolytes, it has also been proposed that cationic retention aids such as cationic starch ethers be used in combination with the ketene dimer for improved sizing results. The concept here is that the force of attraction between the anionic cellulose fibers and the added cationic material will increase the uniformity of distribution and/or the retention of the ketene dimer upon the cellulose fibers and thereby enhance the sizing efficacy of the ketene dimer.

The present invention is based upon a surprising and unexpected discovery that materially improved results in the internal sizing of paper, surpassing the performance of conventional ketene dimer-cationic additive combinations, can be achieved by use of an anionic starch phosphate derivative in combination with a ketene dimer. Notwithstanding the fact that the anionic nature of the starch phosphate derivative normally would be expected to be repulsed by the anionic cellulose fibers and the sizing efficacy of the composition thereby reduced, the opposite has been found to be the case in the present invention whereby the benefits and advantages given by the starch phosphate additive are unexplainably superior in comparison to conventional compositions. While no reasons or explanations have been established to date for the seemingly anomalous results provided by the invention, there is no doubt about the considerable improvements that such results signify, which has been demonstrated with considerable data and tests as will be evident in the examples given below.

As indicated above, the invention entails use of a combination of a ketene dimer and an anionic starch phosphate derivative. The ketene dimer has the formula $(RCH=C=O_2)$ wherein R is a hydrocarbon radical such as alkyl having at least 8 carbon atoms, cycloalkyl having at least 6 carbon atoms, aryl, aralkyl and alkaryl. Specific ketene dimers which my be employed include octyl, decyl, dodecyl, tetradecyl, hexadecyl, octadecyl, phenyl, benzyl, naphthyl and cyclohexyl ketene dimers, as well as ketene dimers prepared from high molecular weight fatty acids including those which are found in natural waxes, fats and oils. Such fatty acids may be used singly or in artificial mixtures or in the naturally occurring mixtures to form ketene dimers thereof by methods which are conventionally in the art.

As for the anionic starch phosphate derivatives to be used in the invention, this comprises a heat reaction product of ungelatinized starch granules and at least one alkali metal phosphate salt impregnated therein. While the final molecular structure is not entirely understood, the reaction product is considered to be starch phosphate ester with orthophosphate groups being attached to hydroxyl groups of the starch molecules via ester bonds. The chemically-bound phosphate groups have a negative charge in aqueous solution or dispersion and are attracted to a positive charge; hence, the starch phosphate derivative is anionic. These starch phosphate derivatives are prepared under controlled reaction conditions which in essence comprise impregnating ungelatinized starch granules with an aqueous solution of at least one alkali metal phosphate salt, this impregnation being effected without gelatinization of the starch granules, then separating the starch granules from any unabsorbed portion of the phosphate salt solution, reducing the moisture content of the granules to 20% by weight or less and finally roasting the granules at temperatures from about 100° C. to about 175° C. to react the starch with the impregnated phosphate salt therein. Such reaction products are sometimes referred to in the art as Neukom starch phosphates and further details regarding their preparation are found in U.S. Pat. 2,865,762.

For use in combination with ketene dimer in accordance with the present invention, the starch phosphate derivative should have a final chemically-bound phosphate content of from 0.1 to 10% expressed in terms of percent $PO_4$ based on the weight of the derivative. For most commercial applications, the phosphate content of the starch phosphate derivative will be adequate if within the range from about 0.5 to about 5% based on the weight of the derivative.

In preparing emulsions of the combinations of ketene dimer and starch phosphate derivative, the concentration of the ketene dimer may vary from 0.05 to 40% based on the weight of the emulsion. However, for most commercial paper-making operations, a concentration of about 1 to about 15% of ketene dimer based on the weight of the emulsion will offer the most convenience and practicality, and these concentrations are therefore preferred.

The amount of starch phosphate derivative included in the emulsion should be such as to yield a ketene dimer:starch phosphate weight ratio within the range from about 10:1 to about 1:50. Again, however, for most convenience and practically in commercial operations, the ketene dimer:starch phosphate weight ratio may be within a preferred range from about 5:1 to about 1:10.

The emulsion is readily prepared by first dispersing the starch phosphate derivative, which is largely water soluble, in the water which is to become the continuous phase of the emulsion. Preferably, the starch phosphate derivative is cooked in the water at temperatures up to about 200° F. and then cooled to about 160° F. to 170° F. Next, the ketene dimer is added and thoroughly admixed at temperatures from about 140° F. to 160° F. until a smooth, homogeneous emulsion is attained. High shear mixing equipment such as a colloid mill, homogenizer, Waring Blendor or an ultrasonic mixing apparatus available commercially under the trade name Sonolator will be useful in carrying out agitation of the ketene dimer-aqueous starch phosphate mixture to attain the desired emulsion.

The emulsion of ketene dimer and starch phosphate derivative may be added to paper beater stock at any time before the stock is sheeted out upon the customary Fourdrinier wire screens. The amount of the emulsion added to the paper beater stock should be such that from about 0.01% to about 3% of ketene dimer dry weight is present in the beater stock based on the dry weight of cellulose fiber contained therein. Following addition of the ketene dimer-starch phosphate emulsion, the beater stock may be sheeted and dried in conventional manner. The improved sizing results provided by the invention will thereupon be achieved without further special processing or treatments.

While the most valuable benefits of the invention are realized in terms of internal sizing of cellulosic fibers, the novel aqueous ketene dimer-starch phosphate emulsion may also be used as a surface size in which case it is applied to the surface of prepared cellulosic sheets rather than to the aqueous pulp or beater stock from which the sheets are prepared. In such surface applications, improved sizing results will also be obtained although not to as large a degree in all cases as compared to internal sizing with the novel emulsion of the invention.

Further details of the invention will be readily understood by reference to the following examples which represent several embodiments thereof.

EXAMPLE 1

In this example, paper sheets were internally sized with aqueous emulsions of a conventional alkyl ketene dimer-cationic starch combination and another combination consisting of the same alkyl ketene dimer and an anionic starch phosphate derivative prepared by the method described in U.S. Pat. No. 2,865,762 using corn starch granules and sodium phosphate. Stock emulsions of both combinations were used containing 6.0% alkyl ketene dimer and 3.0% of the cationic starch and anionic starch phosphate derivative respectively.

A bleached kraft pulp was beaten in a laboratory Valley beater to 430 Canadian standard freeness. Aliquot portions of this pulp, adjusted to pH 7, were diluted to 0.31% cellulose fiber concentration. Suitable portions of the stock emulsions were then admixed with the pulp to give 1% alkyl ketene dimer based on the dry weight of cellulose fiber in each sample.

The treated pulps were then made into sheets in a British sheet mold in accordance with the method prescribed by the Technical Association of the Pulp and Paper Industries, viz Tappi, Testing Method for Hand Sheet Mold Process, T–205–M–58. The sheets were dried for ten minutes at 190° F. and then stabilized by storage for twenty-four hours in a 73° F., 50% relative humidity atmosphere. The sheets were tested for burst factor, tensile breaking length, porosity and Cobb size in accordance with standard conventional test procedures. In each series of tests for the conventional emulsion of alkyl ketene dimer-cationic starch and the emulsion of the present invention of alkyl ketene dimer-anionic starch phosphate derivative, a blank sheet containing no emulsion was prepared and tested, also a sheet containing the above stated proportions of emulsion, and in addition three more sheets containing progressively larger amounts of the cationic starch and anionic starch phosphate derivative respectively.

The results of these tests are recorded in the following tables, Table I giving the results for anionic starch phosphate derivative signified by the symbol SP and Table II giving the results for cationic starch signified by the symbol CS:

TABLE I

| Sample | Burst factor | Percent change | Tensile breaking length (metered) | Percent change | Porosity, sec. | Percent change | Cobb size |
| --- | --- | --- | --- | --- | --- | --- | --- |
| Blank | 60.9 | | 8,125 | | 93.4 | | 0.4567 |
| 1% alkyl ketene dimer plus 0.5% SP | 70.3 | +15 | 8,500 | +4.7 | 174 | +86 | 0.2386 |
| +0.25% added SP | 71 | +16.6 | 8,750 | +7.7 | 261 | +179 | 0.2364 |
| +0.5% added SP | 71.5 | +17 | 8,700 | +7.0 | 281 | +200 | 0.2347 |
| +1.0% added SP | 72.5 | +19 | 8,760 | +7.8 | 299 | +218 | 0.2319 |

TABLE II

| Sample | Burst factor | Percent change | Tensile breaking length (metered) | Percent change | Porosity, sec. | Percent change | Cobb size |
| --- | --- | --- | --- | --- | --- | --- | --- |
| Blank | 61.7 | | 7,794 | | 80.8 | | 0.4546 |
| 1% alkyl ketene dimer plus 0.5% CS | 55.8 | −9 | 7,533 | −3.3 | 144 | +78 | 0.2347 |
| +0.25% added CS | 59.6 | −3 | 8,051 | +3.3 | 182 | +125 | 0.2369 |
| +0.50% added CS | 61.3 | −0.5 | 8,198 | +5.2 | 219 | +171 | 0.2393 |
| +1.0% added CS | 65.0 | +5.6 | 8,463 | +8.6 | 238 | +198 | 0.2429 |

As will be noted from the foregoing results, the emulsion of alkyl ketene dimer-anionic starch phosphate derivative made in accordance with the present invention gave higher strength in the test sheets as compared to the conventional emulsion based on alkyl ketene dimer and cationic starch.

EXAMPLE 2

In this example, the sizing efficacy of various emulsions against an acid ink was tested. Three series of test sheets were prepared with three different emulsions. The first, emulsion A, comprised the alkyl ketene dimer-anionic starch phosphate derivative tested in Example 1 and the second, emulsion B, the alkyl ketene dimer-cationic starch also tested in Example 1. The third emulsion, emulsion C, comprised the same alkyl ketene dimer as in emulsions A and B but combined with a cationic potato starch.

Bleached kraft pulp of 500 Canadian standard freeness was admixed with emulsions A, B and C in an amount comprising 0.05% alkyl ketene dimer and 0.025% of the second emulsion component based on the dry weight of cellulose fibers in the pulp. For each emulsion, one sample sheet was heat dried at 190° F. and tested immediately, another sheet was heat dried at 190° F. and stabilized for 24 hours in 73° F., 50% relative humidity atmosphere prior to testing and a third sheet was air dried and stabilized in the same manner prior to testing. The time required for Skrip's 416 ink, adjusted to pH 1.5 with hydrochloric acid, to penetrate each sheet was determined and is recorded in the following table:

TABLE III

| | Ink penetration (min.) | | |
| --- | --- | --- | --- |
| Sample | Emulsion A | Emulsion B | Emulsion C |
| Heat dried and tested immediately | 11 | 4 | 5 |
| Heat dried and stabilized 24 hours | 18 | 6 | 7 |
| Air dried and stabilized 24 hours | 7 | 1 | 1.5 |

As is evident, emulsion A made in accordance with the present invention gave superior internal sizing as illustrated by the materially longer times that the sheets sized with emulsion A were capable of resisting penetration by the acid ink.

EXAMPLE 3

The results of Example 2 were further verified in additional ink penetration tests in which the proportion of the non-alkyl ketene dimer component in each emulsion A, B and C was increased three times by increments of 0.25%, 0.50% and 1.0%. In these additional tests, all samples were heat dried at 190° F. and tested immediately, and the results are recorded in the following table:

TABLE IV

| Sample | Ink penetration (min.) | | |
|---|---|---|---|
| | Emulsion A | Emulsion B | Emulsion C |
| 0.25% added non-ketene dimer component | 13 | 8 | 10.2 |
| 0.50% added non-ketene dimer component | 14 | 8.3 | 11 |
| 1.0% added non-ketene dimer component | 15 | 9 | 11 |

Again, the results achieved with emulsion A of the present invention surpassed those of the conventional emulsions. In addition, the bursting factor and tensile strengths of duplicate sheets constituting the second samples in Table IV above (having 0.5% added non-alkyl ketene dimer component) were determined for each of the emulsions A, B and C and, as noted in the following table, these properties were notably increased to a greater extent reflecting higher strength in the sheet containing emulsion A:

TABLE V

| Sample | Burst factor, percent change | Tensile breaking length, percent change |
|---|---|---|
| Emulsion A | +12.9 | +14.1 |
| Emulsion B | +5.6 | +0.2 |
| Emulsion C | +6.7 | +4.8 |

Additional test sheets containing emulsions A, B and C of Example 3 were prepared and tested for resistance to penetration by a 20% solution of lactic acid, an established test for food boards or milk carton stock. For each emulsion, tests were run with one sample having the 2:1 weight proportion of alkyl ketene dimer to the other component as was used in Example 3 and with a second sample in which the proportion of the other component was increased by addition of 0.5% thereof. Also, for each emulsion, triplicate samples differing from each other by the manner of drying and stabilizing thereof as described in connection with Table III of Example 2 were tested. The results of these tests are recorded in the following table:

TABLE VI

| Sample | Penetration by lactic acid (min.) | | |
|---|---|---|---|
| | Heat dried, tested immediately | Heat dried, stabilized 24 hours | Air dried, stabilized 24 hours |
| Emulsion A | 3.1 | 5.5 | 3.1 |
| Emulsion A +0.5% added other component | 3.7 | 6.5 | 3.6 |
| Emulsion B | 0.9 | 2.3 | 1.0 |
| Emulsion B +0.5% added other component | 1.7 | 3.2 | 1.7 |
| Emulsion C | 1.6 | 3.3 | 1.5 |
| Emulsion C +0.5% added other component | 2.3 | 4.0 | 2.5 |

As the foregoing results show, the test sheets sized internally with emulsion A made in accordance with the present invention were superior in resistance to penetration by the 20% lactic acid solution.

It will be understood that it is intended to cover all changes and modifications of the preferred embodiments of the invention, herein chosen for the purpose of illustration, which do not constitute departures from the spirit and scope of the invention.

What is claimed is:

1. A composition of matter particularly useful for sizing cellulosic fibers which comprises a mixture of a ketene dimer having the formula:

$$(RCH=C=O)_2$$

wherein R is alkyl having at least 8 carbon atoms, cycloalkyl having at least 6 carbon atoms, aryl, aralkyl, or alkaryl, and a starch phosphate derivative prepared by impregnating ungelatinized starch granules with an aqueous solution of at least one alkali metal phosphate salt, separating said granules from any unabsorbed portion of said solution and then roasting said granules at temperatures from about 100° C. to about 175° C. to react the starch with said absorbed phosphate salt, the ketene dimer:starch phosphate weight ratio in said mixture being from about 10:1 to about 1:50.

2. A composition as in claim 1 emulsified in water, the concentration of said ketene dimer in said emulsion being from about 0.05% to about 40% based on the weight of said emulsion.

3. A composition as in claim 1 wherein said ketene dimer:starch phosphate weight ratio is from about 5:1 to about 1:10.

4. A method of forming a composition of matter particularly useful for sizing cellulosic fibers which comprises forming an admixture of a ketene dimer having the formula:

$$(RCH=C=O)_2$$

wherein R is alkyl having at least 8 carbon atoms, cycloalkyl having at least 6 carbon atoms, aryl, aralkyl, or alkaryl, and a starch phosphate derivative prepared by impregnating ungelatinized starch granules with an aqueous solution of at least one alkali metal phosphate salt, separating said granules from any unabsorbed portion of said solution and then roasting said granules at temperatures from about 100° C. to about 175° C. to react the starch with said absorbed phosphate salt, the ketene dimer:starch phosphate weight ratio in said admixture being from about 10:1 to about 1:50, and then emulsifying said admixture in water with the aid of high shear action.

5. A method as in claim 4 wherein the concentration of said ketene dimer in said emulsion is from about 0.05% to about 40% based on the weight of said emulsion.

6. A method as in claim 4 wherein said emulsifying step is carried out at an elevated temperature from about 140° to about 170° F.

7. A method as in claim 4 wherein said ketene dimer: starch phosphate weight ratio is from about 5:1 to about 1:10.

8. A method of sizing cellulosic fibers which comprises applying to said fibers an aqueous emulsion of an admixture of a ketene dimer having the formula:

$$(RCH=C=O)_2$$

wherein R is alkyl having at least 8 carbon atoms, cycloalkyl having at least 6 carbon atoms, aryl, aralkyl, or alkaryl, and a starch phosphate derivative prepared by impregnating ungelatinized starch granules with an aqueous solution of at least one alkali metal phosphate salt, separating said granules from any unabsorbed portion of said solution and then roasting said granules at temperatures from about 100° C. to about 175° C. to react the starch with said absorbed phosphate salt, the ketene dimer:starch phosphate weight ratio in said mixture being from about 10:1 to about 1:50.

9. A method as in claim 8 wherein said emulsion is applied by adding it to an aqueous suspension of said fibers, and said suspension is thereafter formed into a sheet and dried.

10. A method as in claim 8 wherein said emulsion is applied to a preformed dry sheet of said fibers.

11. A method as in claim 8 wherein said emulsion is applied in an amount which provides from about 0.01% to about 3% of said ketene dimer based on the dry weight of said fibers.

References Cited

UNITED STATES PATENTS

| 3,130,118 | 4/1964 | Chapman | 162—175 |
|---|---|---|---|
| 3,132,066 | 5/1964 | Kerr | 162—175 |

S. LEON BASHORE, Primary Examiner

F. FREI, Assistant Examiner

U.S. Cl. X.R.

106—210, 213; 127—33; 162—158; 260—233.5

PO-1050
(5/69)

UNITED STATES PATENT OFFICE
CERTIFICATE OF CORRECTION

Patent No. 3,524,796          Dated August 18, 1970

Inventor(s) Naoyuki Henry Yui and Lawrence R. Cohen

It is certified that error appears in the above-identified patent and that said Letters Patent are hereby corrected as shown below:

Col. 1, Line 59: "(RCH=C=O$_2$)" should read --(RCH=C=O)$_2$--

Col. 5, Line 64 (Table VI): "6.5" should read --6.4--

SIGNED AND
SEALED
NOV 17 1970

(SEAL)
Attest:

Edward M. Fletcher, Jr.
Attesting Officer

WILLIAM E. SCHUYLER, JR.
Commissioner of Patents